United States Patent
Chu et al.

(10) Patent No.: US 11,134,443 B2
(45) Date of Patent: Sep. 28, 2021

(54) SYSTEMS AND METHODS FOR GENERATING AND TRANSMITTING SHORT LOW POWER WAKE-UP REQUEST (WUR) FRAMES IN A WIRELESS COMMUNICATION SYSTEM

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 86 days.

(21) Appl. No.: 16/264,431

(22) Filed: Jan. 31, 2019

(65) Prior Publication Data

US 2019/0289548 A1 Sep. 19, 2019

Related U.S. Application Data

(60) Provisional application No. 62/644,958, filed on Mar. 19, 2018.

(51) Int. Cl.
*H04W 52/02* (2009.01)
*H04L 29/06* (2006.01)
(Continued)

(52) U.S. Cl.
CPC ....... *H04W 52/0229* (2013.01); *H04W 48/16* (2013.01); *H04W 52/0216* (2013.01); *H04W 52/0235* (2013.01); *H04W 52/54* (2013.01)

(58) Field of Classification Search
CPC ......... H04W 52/0235; H04W 52/0229; H04W 84/11; H04W 52/0216; H04W 52/54;
(Continued)

(56) References Cited

U.S. PATENT DOCUMENTS

2018/0192373 A1* 7/2018 Fang ................. H04W 52/0235
2019/0007904 A1* 1/2019 Asterjadhi ........ H04W 52/0229
(Continued)

OTHER PUBLICATIONS

Liwen Chu, "BSSID Information in FCS", IEEE Draft, vol. 802. 11-18/0412r3, Feb. 28, 2018, 7 pages.
(Continued)

*Primary Examiner* — Edan Orgad
*Assistant Examiner* — Vanneilian Lalchinthang

(57) ABSTRACT

Embodiments described herein provide a method for creating a low power wake-up radio frame. The method comprises generating, at an access point, a wake-up radio frame for transmission to one or more client stations, determining whether the wake-up radio frame is to be transmitted inside or outside a basic service set associated with the access point, the basic service set having a basic service set identifier that is used to identify the access point. And in response to determining that the wake-up radio frame is to be transmitted outside the basic service set, computing, a target frame check sequence for the wake-up radio frame without using the basic service set identifier associated with the basic service set, appending the target frame check sequence to the wake-up radio frame; and transmitting, to one or more client stations, the wake-up radio frame with the appended target frame check sequence.

20 Claims, 4 Drawing Sheets

(51) Int. Cl.
*H04W 48/16* (2009.01)
*H04W 52/54* (2009.01)

(58) Field of Classification Search
CPC .. H04W 48/16; H04W 72/0446; H04L 69/22; H04L 1/0061; Y02D 30/70
USPC .......................................................... 370/311
See application file for complete search history.

(56) References Cited

U.S. PATENT DOCUMENTS

| | | | |
|---|---|---|---|
| 2019/0082390 A1* | 3/2019 | Azizi | H04L 5/0007 |
| 2019/0098574 A1* | 3/2019 | Huang | H04W 52/0229 |
| 2019/0208470 A1* | 7/2019 | Asterjadhi | H04L 69/22 |
| 2019/0246351 A1* | 8/2019 | Yang | H04W 52/0216 |
| 2019/0268192 A1* | 8/2019 | Lim | H04L 5/0092 |
| 2019/0327672 A1* | 10/2019 | Hwang | H04L 41/0806 |
| 2019/0349857 A1* | 11/2019 | Kim | H04W 76/27 |
| 2019/0357143 A1* | 11/2019 | Wang | H04W 52/0229 |
| 2019/0364505 A1* | 11/2019 | Wang | H04W 52/0235 |
| 2020/0187120 A1* | 6/2020 | Alanen | H04L 1/0025 |
| 2020/0196241 A1* | 6/2020 | Lou | H04W 52/0216 |

OTHER PUBLICATIONS

Liwen Chu., "Short WUR Frame", IEEE Draft, 802.11-18/0411r0, Feb. 28, 2018, 4 pages.
International Search Report and Written Opinion dated Mar. 15, 2019 in PCT/US2019/016066.

* cited by examiner

SYSTEMS AND METHODS FOR GENERATING AND TRANSMITTING SHORT LOW POWER WAKE-UP REQUEST (WUR) FRAMES IN A WIRELESS COMMUNICATION SYSTEM

CROSS-REFERENCE TO RELATED APPLICATION

This claims the benefit under 35 U.S.C. § 119(e) of U.S. Provisional Patent Application No. 62/644,958, filed Mar. 19, 2018, which is hereby incorporated by reference herein in its entirety.

FIELD OF USE

This disclosure relates to managing low power devices in a wireless communication system, and specifically, to generating and transmitting short low power wake-up request (WUR) frames to low power devices in a wireless communication system.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In existing systems, a wireless local area network (WLAN) is usually used in an environment to interconnect a group of user devices, such as the Internet of Things (IoT) devices. For example, in a home environment, devices such as a thermostat, a laptop computer, a smart phone, a television set-top box, and/or the like, can be interconnected under the home WLAN. Such user devices are often low power Wi-Fi devices (also referred to as "low power devices" herein), which includes a low power wake-up receiver used as a companion radio receiver with an 802.11 WLAN receiver, which low power wake-up receiver is used to serve as a WUR signal receiver, while the 802.11 WLAN receiver is used to receive payload user data after the WUR signal is received. The low power device may transit into a sleep mode by turning off the Wi-Fi module to save power, e.g., when the device is not in use.

To maintain the connection between an access point and a low power device of the WLAN, for example, the access point may need to transmit a WUR signal to "wake up" the low power device, e.g., a thermostat, such that the thermostat is notified and thus prepared to receive data packets of configuration data on the regular Wi-Fi from the access point. Traditionally, WUR frames may be transmitted within a basic service set associated with the access point at which the WUR originates. In such cases, the basic service set identifier (BSSID) associated with the wake-up frame is embedded within the WUR frame. The embedded BSSID makes the WUR frame long and increases the power consumption during transmission.

SUMMARY

Embodiments described herein provide systems and methods for creating a low power wake-up radio frame. In some aspects, an access point generates a wake-up radio frame for transmission to one or more client stations. The access point determines whether the wake-up radio frame is to be transmitted inside or outside a basic service set associated with the access point, the basic service set having a basic service set identifier that is used to identify the access point. In response to determining that the wake-up radio frame is to be transmitted outside the basic service set, the access point computes a target frame check sequence for the wake-up radio frame without using the basic service set identifier associated with the basic service set. The access point appends the target frame check sequence to the wake-up radio frame and transmits the wake-up radio frame with the appended target frame check sequence to one or more client stations.

In some embodiments, the access point determines whether the wake-up radio frame is to be transmitted inside or outside a basic service set associated with the access point by determining a type of the wake-up radio frame. In response to determining that the type of the wake-up radio frame is selected from a group of a beacon frame type, a wake-up frame type, and a vendor specific frame type, determining that the wake-up radio frame is to be transmitted inside the basic service set, and in response to determining that the type of the wake-up radio frame is a discovery frame type, determining that the wake-up radio frame is to be transmitted outside the basic service set. In some embodiments, in response to determining that the wake-up radio frame is to be transmitted inside the basic service set, configuring a bit in a frame control segment of the wake-up radio frame to indicate that the target frame check sequence is computed based at least in part on the basic service set identifier.

In some embodiments, in response to determining that the wake-up radio frame is to be transmitted inside the basic service set, the access point computes the target frame check sequence for the wake-up radio frame based at least in part on the basic service set identifier, and removes the basic service set identifier from the wake-up radio frame before transmitting the wake-up radio frame with the appended target frame check sequence to the one or more client stations. In some embodiments, computing the target frame check sequence for the wake-up radio frame based at least in part on the basic service set identifier further comprises computing the target frame check sequence for the wake-up radio frame based at least in part on a destination address, removing the destination station address from the wake-up radio frame.

In some aspects, embodiments described herein provide a method for receiving a low power wake-up radio frame. The method comprises receiving, at a client station from a wireless access point, a wake-up radio frame. The client station identifies a target frame check sequence from the wake-up radio frame, determines whether the target frame check sequence was computed based on a basic service set identifier based on characteristics of the wake-up radio frame, and in response to determining that the target frame check sequence was not computed based on the basic service set identifier, computing, a test frame check sequence for the wake-up radio frame using components of the received wake-up radio frame, comparing the test frame check sequence with a target frame check sequence from the wake-up radio frame, and in response to the determining that the test frame check sequence matches the target frame check sequence, accepting the wake-up radio frame at the client station, and in response to the determining that the test frame check sequence does not match the target frame check sequence, discarding the wake-up radio frame at the client station.

In some embodiments, determining whether the target frame check sequence was computed based on the basic service set identifier further comprises determining a type of the received wake-up radio frame; and in response to determining that the type of the wake-up radio frame is selected from a group of a beacon frame type, a wake-up frame type, and a vendor specific frame type, determining that the target frame check sequence was computed based on the basic service set identifier; and in response to determining that the type of the wake-up radio frame is a discovery frame type, determining that the target frame check sequence was computed based on components of the received wake-up radio frame.

In some embodiments, determining whether the target frame check sequence was computed based on the basic service set identifier further comprises identifying a control bit indicative of whether the target frame check sequence was computed using the basic service set identifier from a frame control segment of the wake-up radio frame. In some embodiments, in response to determining that the target frame check sequence was computed based on the basic service set identifier computing the test frame check sequence for the wake-up radio frame based on components of the received wake-up radio frame and the basic service set identifier.

In some embodiments, computing the test frame check sequence based on components of the received wake-up radio frame and the basic service set identifier further comprises computing the target frame check sequence for the wake-up radio frame based at least in part on a destination address assigned to the client station.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for generating and transmitting short low power wake-up radio (WUR) frames. Specifically, the application describes a shortened WUR frame for transmission from an access point to a destination to achieve low latency and low power consumption at the access point and at each destination station.

Traditionally, the basic service set identifier (BSSID) is used in each WUR frame for a receiver to identify the access point that initiates the transmission of the WUR frame. However, the embedded BSSID results in a much longer WUR frame, and thus requires more power for transmission. Some existing systems remove the embedded BSSID but calculate a frame check sequence (FCS) based on the BSSID to result in a shorter WUR frame to save transmission power. However, when the embedded BSSID is used in computing the FCS, a destination station that receives the WUR frame outside the basic service set is unable to recover the BSSID.

In view of this problem, a WUR frame transmission mechanism is described herein, which differentiates WUR frames that are transmitted within or outside the BSS. For example, when a WUR frame is to be transmitted outside the BSS, the BSS identifier is not required for transmission of the WUR frame. When a WUR frame is transmitted within a basic service set, the BSSID is used to calculate the FCS value which will be appended to the WUR frame. In this way, no BSSID is embedded into the WUR frame for transmission to result in a shorter WUR frame, which results in transmission power efficiency as well as efficiency with respect to network bandwidth usage.

Figure 1:
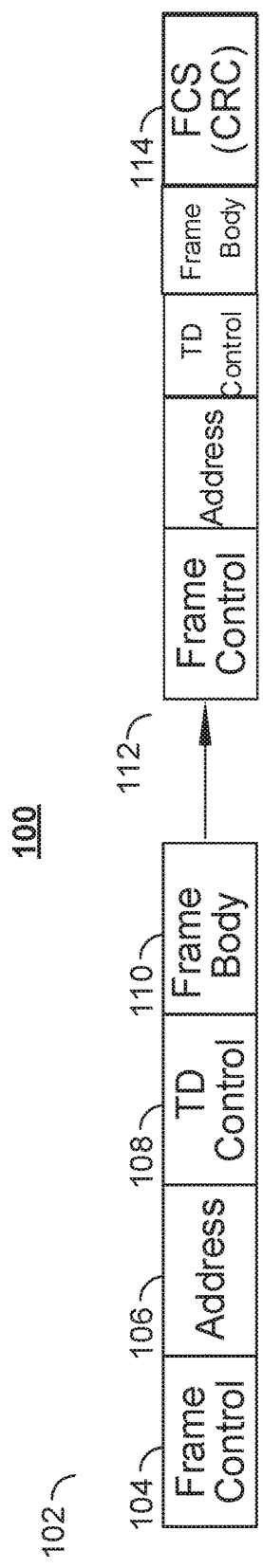
FIGS. 1-3 are block diagrams illustrating different example WUR frames generated at an access point, according to some embodiments described herein.

FIG. 1 illustrates an example WUR frame transmitted outside a basic service set, according to some embodiment described herein. An example of a WUR frame transmitted outside the basic service set can be a discovery frame, a vendor specific or beacon frame, etc. The access point may configure a WUR frame 102 for transmitting to stations associated with the access point. In some embodiments, the access point may generate WUR frames based on information to be transmitted to client stations.

For example, the access point may be configured to configure the WUR frame 102 with a frame control segment 104, an address 106, type dependent (TD) control 108, and frame body 110. In some embodiments, frame control 104 is a header of the WUR frame that includes an indicator bit. When the indicator bit is set, the calculation of the FCS includes the BSSID of the access point that generates the WUR frame. In some embodiments, the frame control 104 may indicate whether the calculation of the FCS includes the BSSID of the access point that generates the WUR frame through the type of WUR frame 102 being transmitted. In some embodiments, WUR frame 102 is a broadcast frame and therefore, address 106 is the address of the access point that transmits the WUR frame 102. In some embodiments, TD control 108 is responsible for type dependent information. In one embodiment, TD control 108 carries partial TSF time in the WUR beacon frame 102 for stations to synchronize with the access point that transmits the WUR Beacon frame 102.

Before WUR frame 102 is transmitted, the access point computes a FCS 114 based on the components of the frame 102 and whether the frame is for the stations inside the BSS or outside the BSS. The calculated FCS 114 is appended to WUR frame 102 to create WUR frame 112. WUR frame 110 is then transmitted to the destination station. WUR frame 102 is an example of a frame transmitted outside a basic service set, and so does not include a basic service set identifier embedded within the WUR frame 102. When WUR frame 112 is received at a destination station specified in by address 106, the destination station independently computes a test FCS value based on the received WUR frame 114. This test FCS value is compared to the FCS value 114 received with the WUR frame 112. Only when the test FCS value matches the received FCS value 114, is the WUR frame 112 accepted at the destination station for further processing.

Figure 2:
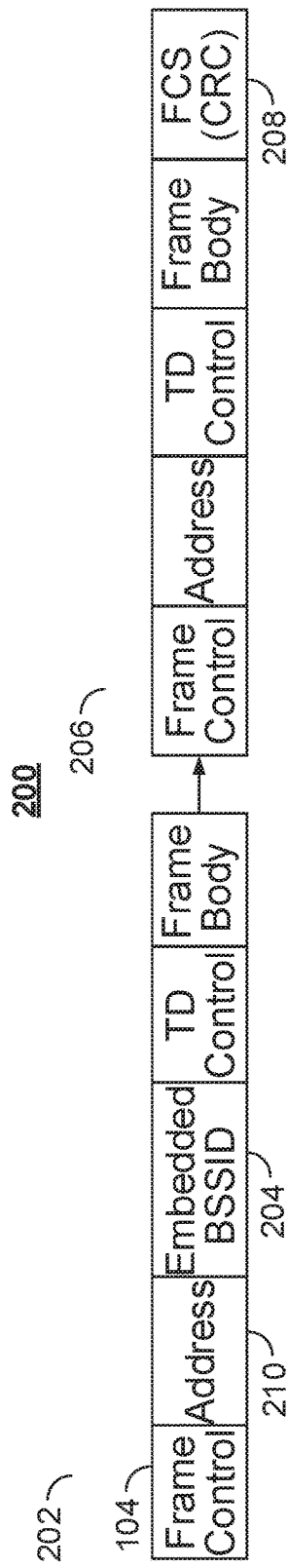

FIG. 2 illustrates an example WUR frame transmitted within a basic service set according to some embodiment described herein. Examples of WUR frames transmitted inside the basic service set include the beacon frame, the wake-up frame, and certain vendor specific frames. WUR frame 202 generated at the access point for a destination is similar to WUR frame 102, except WUR frame 202 has an additional embedded BSSID 204, because the WUR frame 202 is to be transmitted inside the basic service set. Additionally, in such embodiments, the address 210 of frame 202 is a destination address to which the frame 202 is directed. In some embodiments, the embedded BSSID 204 identifies an access point at which the WUR frame 202 originated. As described with respect to FIG. 1, the access point computes a FCS 208 based on the components of the WUR frame 202. The FCS 208 is different from FCS 114, because the FCS 208 is based on the components of the WUR frame as described in FIG. 1, and the embedded BSSID 204.

Once the FCS 208 has been computed, embedded BSSID 204 is removed from the WUR frame 202 and FCS 208 is appended to the WUR frame 204 to yield WUR frame 206. In some embodiments, WUR frame 206 without an embedded BSSID, is then transmitted to the destination station as specified in the address 106 of the WUR frame 202.

In some embodiments, the transmitted frame 112 is similar to the transmitted frame 206, except that the FCS 114 of WUR frame 112 is calculated without a BSSID and the FCS 208 of WUR frame 206 is computed using an embedded BSSID 204. In such cases when the BSSID is removed from the WUR frame 202 to yield WUR frame 206, the access point has a plurality of ways to indicate whether the embedded BSSID 204 has been used in the calculation of the FCS 208 in the WUR frame 206.

In some embodiments, the access point may set an indicator bit in the Frame Control field 104 of WUR frame 202 to indicate the use of the embedded BSSID 204 in the calculation of the FCS 208. When the WUR frame 206 is received at the destination station, the destination station checks for the value of the indicator bit in the Frame control field 104. When the destination station determines that the indicator bit in the Frame control field 104 is set to a specific value indicating the use of BSSID, the station computes a test FCS with a BSSID associated with the originating access point. For example, for destination stations within the basic service set, the BSSID may be shared with the destination station such that the BSSID can be used to compute the test FCS. The station then compares the computed test FCS with FCS 208, and based on the comparison, the station determines whether the WUR frame 206 is to be accepted or rejected.

In some embodiments, the receiving station is configured to determine whether the WUR frame 208 was transmitted within a basic service set (BSS) or outside a BSS based on the type of the frame received. As described with respect to FIG. 1, frame types such as beacon, wake-up, and vendor specific frames are always transmitted within the BSS, and therefore will have a BSSID that was used in the calculation of the FCS 208 associated with the received WUR frame 206. When the receiving station determines that the frame type is one of beacon, wake-up, or a different vendor-specific frame, the station will use a BSSID to calculate a test FCS value for the received WUR frame 208.

Figure 3:
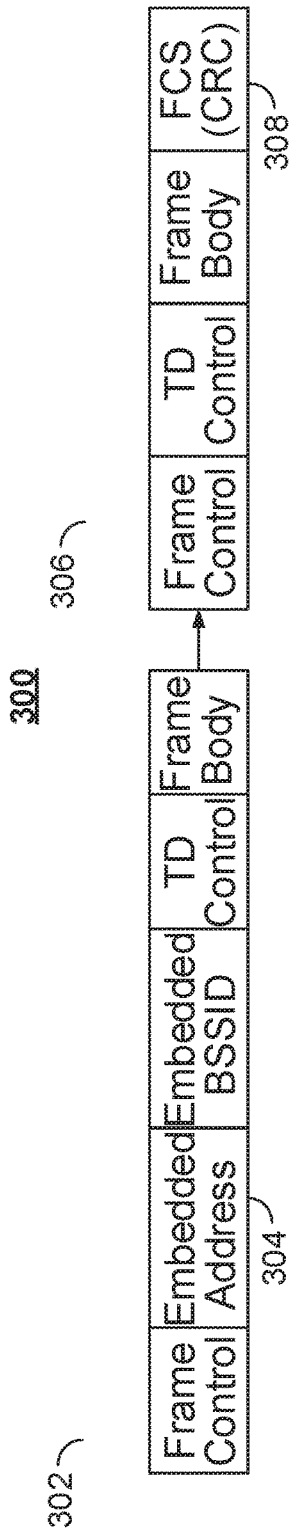

FIG. 3 illustrate an example WUR frame using an embedded address for FCS computation when the WUR frame is transmitted within a basic service set, according to the embodiment described in FIG. 2. WUR frame 302 generated at the access point for a destination is similar to WUR frame 202 as described in FIG. 2. In some embodiments, WUR frame 302, includes an address 106, that may specify a destination for the WUR frame. In some embodiments, the address 106 may be an indication of the access point. In some embodiments, upon determining that the WUR frame 302 is transmitted within a basic service set, the access point further shortens WUR wake-up frame 302 by removing the address 302 from the WUR wake up frame 302. The address 304, along with the BSSID and other parts of the WUR frame are used in the calculation of the FCS 308. The FCS 308 is appended to the end of the WUR frame 302, and the address 304 and BSSID 204 are removed from WUR frame 302 to yield WUR frame 306 for transmission.

Every station connected to the access point, upon receiving the WUR frame 306 computes a test FCS value using the components of the received WUR frame 306, the BSSID shared with the receiving station within the basic service set, and the address assigned to the particular station. In some embodiments, the address 304 may be the address of the access point from which the WUR frame 306 is transmitted. The address of the access point may be used to compute the test FCS value. The computed FCS value is compared to the received FCS value 308. If the computed FCS value matches the received FCS value 308 at a particular station, the particular station is the intended recipient of the WUR frame 306, and the first station accepts the WUR frame 306 for further processing. In case the computed FCS value does not match the received FCS value 308 at a second station, the WUR frame 306 was not intended for the second station and is discarded by the second station.

Figure 4:
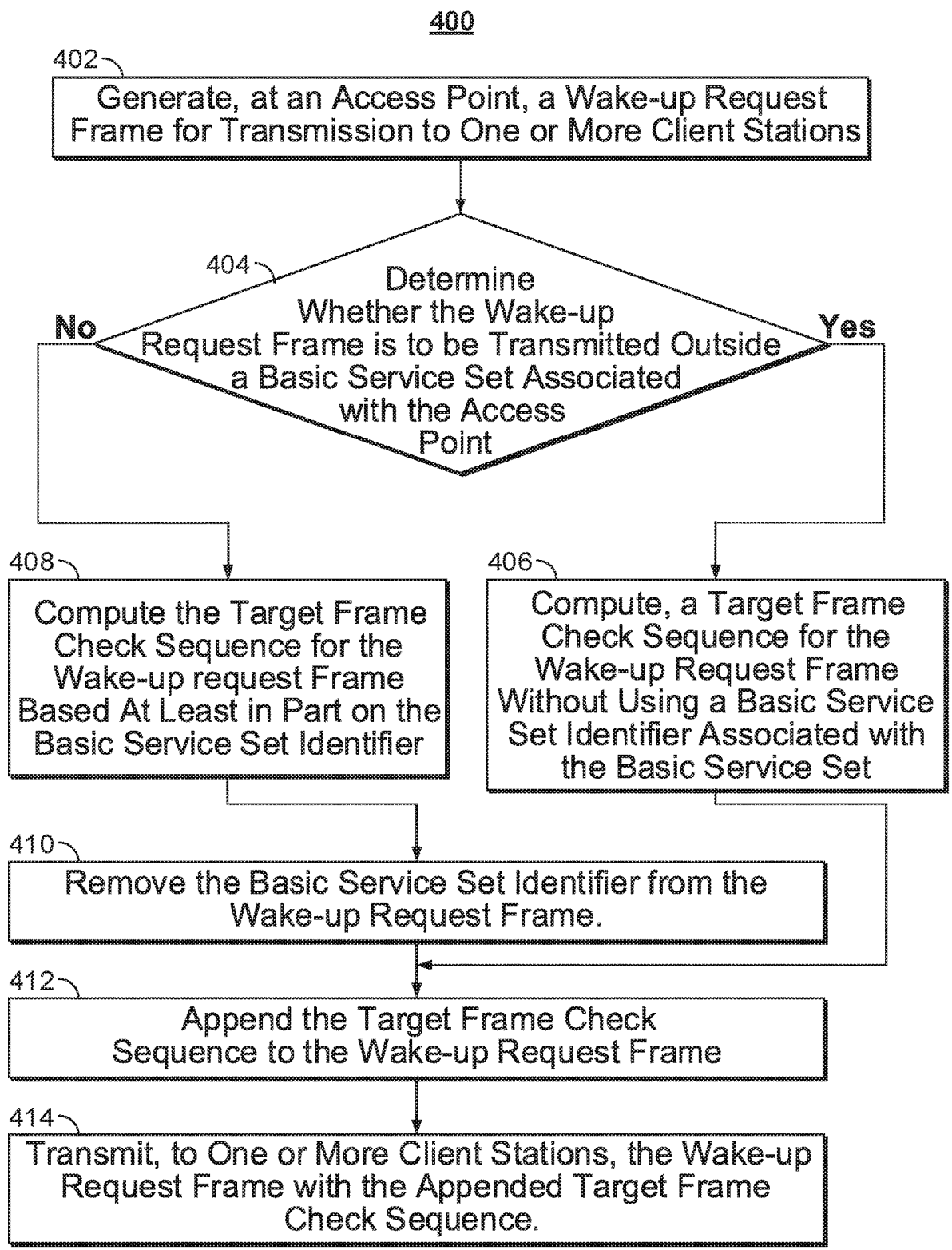
FIG. 4 shows an example logic diagram illustrating a wireless access point configuring and transmitting a WUR frame (similar to those described in FIGS. 1-3) to wake up a low power device prior to transmitting payload data, according to embodiments described herein.

FIG. 4 shows an example logic diagram illustrating a process 400 implemented by a wireless access point to configure and transmit a WUR frame (similar to those described in FIGS. 1-3) to wake up a low power device prior to transmitting payload data, according to embodiments described herein. The process shown in FIG. 4 may be implemented at a wireless communication device (605 in FIG. 6) that is operated in compliance with the 802.11 standard, e.g., 802.11ax, 802.11az, etc.

At 402, the wireless access point is configured to generate a wake-up radio frame for transmission to one or more client stations, e.g., from a host system, for transmission to one or more low power wireless devices in the same WLAN of the access point. At 404, the access point determines whether the wake-up request frame is to be transmitted outside a basic service set associated with the access, e.g., this determination may be based on a type of the frame. WUR frames of the type beacon, wake-up and vendor specific frames are transmitted within a basic service set. WUR frames of the type discovery are transmitted outside the basic service set. In case the WUR frame is to be transmitted outside the basic service set, process 400 movies to 406 to compute a target FCS for the WUR frame without using a basic service set identifier associated with the basic service set. In case the WUR frame is to be transmitted inside the basic service set, process 400 movies to 408 to compute a target FCS for the WUR frame based at least in part on the basic service set identifier associated with the basic service set. At 410, the access point removes the basic service set identifier from the WUR frame. From 406 or 410, process 400 proceeds to 412 to append the target FCS to the WUR frame. At 414, the access point transmits, to one or more client stations, the wake-up radio frame with the appended target FCS.

Figure 5:
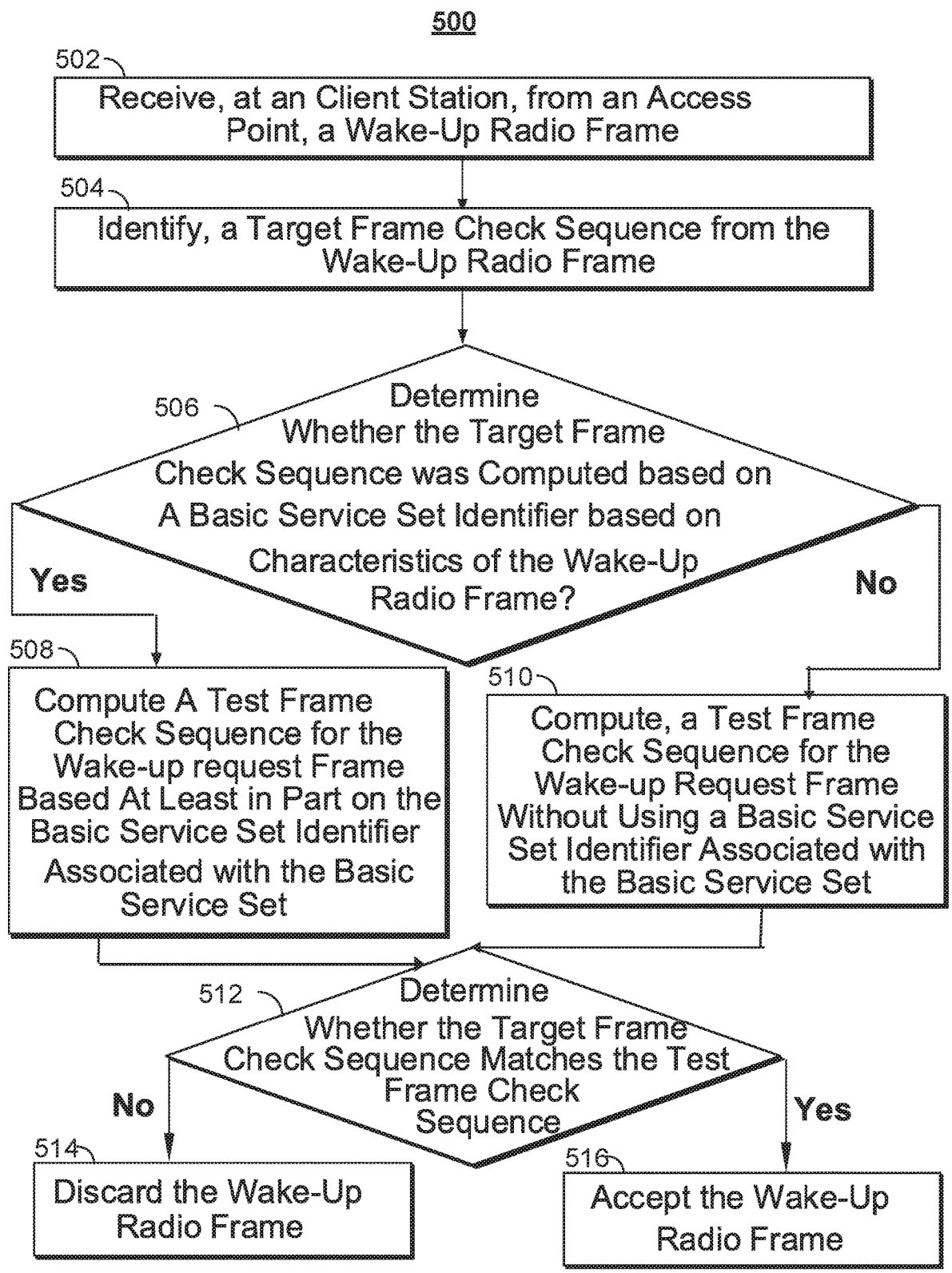
FIG. 5 shows an example logic diagram illustrating a client station receiving a WUR frame (similar to those described in FIGS. 1-3) from an access point, according to embodiments described herein.

FIG. 5 shows an example logic diagram illustrating a process 500 implemented by a client station when receiving a WUR frame (similar to those described in FIGS. 1-3) from an access point, according to embodiments described herein.

The process shown in FIG. 4 may be implemented at a wireless communication device (605 in FIG. 6) that is operated in compliance with the 802.11 standard, e.g., 802.11ax, 802.11az, etc.

At 502, a client station receives a WUR frame from an access point, e.g., from a host system. At 504, the client station identifies a target FCS from the received WUR, e.g., FCS 114, 208, or 308 as described in FIGS. 1-3. At 506, the client station determines whether the target FCS was computed based on a basic service set identifier based on characteristics of the wake-up radio frame, e.g., WUR frames of the type beacon, wake-up and vendor specific frames are transmitted within a basic service set. For WUR frames transmitted within the basic service set, the calculation of the target FCS is based on the BSSID associated with the access point. Additionally, WUR frames of the type discovery are transmitted outside the basic service set. For WUR frames transmitted outside the basic service set, the calculation of the target FCS is not based on the BSSID associated with the access point. As described in FIGS. 2-3, the client station may determine that the target FCS of the WUR frame is calculated using the BSSID, based on the type of the WUR frame transmitted. In some embodiments, the client station may determine that the target FCS of the WUR frame is computed using the BSSID based in an indicator bit in the Frame control segment 104. In response to determining that the target FCS was not computed based on the basic service set identifier, process 500 proceeds to 508 to compute, a test FCS for the wake-up radio frame using components of the received wake-up radio frame. In response to determining that the target FCS was computed based on the basic service set identifier, process 500 proceeds to 510 to compute, a test FCS based at least in part on the BSSID of the access point in addition to the components of the received WUR frame. The test FCS computed at either 508 or 510 is compared to the target FCS from the received WUR frame to determine, at 512, whether the test FCS matches the target FCS. In response to the determining that the test FCS matches the target frame FCS, process 500 proceeds to 516 to accept the wake-up radio frame at the client station. In response to the determining that the test FCS does not match the target FCS, process 500 proceeds to 514 to discard the wake-up radio frame at the client station.

Figure 6:
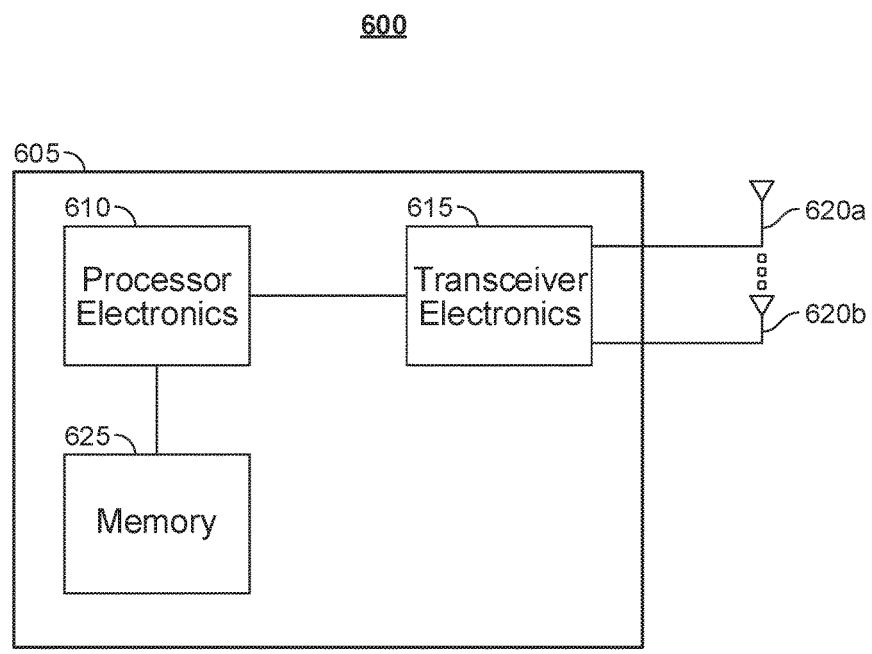
FIG. 6 shows a simplified block diagram of an example of a wireless communication device configured to implement the process described in FIG. 4, according to embodiments described herein.

FIG. 6 shows a simplified block diagram of an example of a wireless communication device configured to implement the process described in FIG. 4, according to embodiments described herein. Various examples of device 605 include an access point, a base station (BS), a client device, an access terminal (AT), a client station, or a mobile station (MS), and/or the like. For example, the device 605 can represent the access point or the low power device discussed throughout FIGS. 1-5.

The device 605 can include processor electronics 610 such as one or more processors that implement methods effecting the techniques presented in this disclosure. The processor electronics 610 can be operable to execute computer-readable instructions that, when executed on the processor electronics 610, cause the device 605 to implement methods (e.g., shown in FIG. 4) effecting the techniques presented in this disclosure. For example, the processor electronics 410 can decode a received uplink A-MPDU to determine whether a client station supports duplex transmission, or to identify a legacy PHY SIG or 802.11 PHY ISIG from the uplink A-MPDU.

The device 605 can include transceiver electronics 615 (e.g., a transmitter, receiver, or transceiver) to send and/or receive wireless signals over one or more antennas 620a-620b. In some embodiments, transceiver electronics 615 can include multiple radio units. In some embodiments, a radio unit includes a baseband unit (BBU) and a radio frequency unit (RFU) to transmit and receive signals. In some embodiments, the device 605 includes dedicated circuitry for transmitting (e.g., a dedicated transmitter) and dedicated circuitry for receiving (e.g., a dedicated receiver). For example, transceiver electronics 615 can include one or more receivers that receive one or more signals from one or more antennas 620a-620b, transmitted over one or more WLAN channels.

The device 605 can include one or more memories 625 configured to store information such as data and/or instructions (e.g., computer-readable instructions that cause the device 605 to implement methods effecting the techniques presented in this disclosure.

Various embodiments discussed in conjunction with FIGS. 1-5 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., wireless access point, low power devices discussed in relation to FIGS. 1-4), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for creating a low power wake-up radio frame, the method comprising:
    generating, at an access point, a wake-up radio frame for transmission to one or more client stations;
    determining whether the wake-up radio frame is to be transmitted inside or outside a basic service set associated with the access point, the basic service set having a basic service set identifier that is used to identify the access point; and in response to determining that the wake-up radio frame is to be transmitted outside the basic service set:
 computing, a target frame check sequence for the wake-up radio frame without using the basic service set identifier associated with the basic service set;
 providing a bit in a frame control segment of the wake-up radio frame indicative of the target frame check sequence computed without using the basic service set identifier associated with the basic service set;
 appending the target frame check sequence to the wake-up radio frame; and
 transmitting, to the one or more client stations, the wake-up radio frame with the appended target frame check sequence.

2. The method of claim 1, wherein the determining whether the wake-up radio frame is to be transmitted inside or outside a basic service set associated with the access point comprises:
 determining a type of the wake-up radio frame; and
 in response to determining that the type of the wake-up radio frame is selected from a group of a beacon frame type, a wake-up frame type, and a vendor specific frame type, determining that the wake-up radio frame is to be transmitted inside the basic service set; and
 in response to determining that the type of the wake-up radio frame is a discovery frame type, determining that the wake-up radio frame is to be transmitted outside the basic service set.

3. The method of claim 1, further comprising:
 in response to determining that the wake-up radio frame is to be transmitted inside the basic service set:
 configuring the bit in a frame control segment of the wake-up radio frame to indicate that the target frame check sequence is computed based at least in part on the basic service set identifier.

4. The method of claim 1, further comprising:
 in response to determining that the wake-up radio frame is to be transmitted inside the basic service set:
 computing the target frame check sequence for the wake-up radio frame based at least in part on the basic service set identifier; and
 removing the basic service set identifier from the wake-up radio frame before transmitting the wake-up radio frame with the appended target frame check sequence to the one or more client stations.

5. The method of claim 4, wherein the computing the target frame check sequence for the wake-up radio frame based at least in part on the basic service set identifier further comprises:
 computing the target frame check sequence for the wake-up radio frame based at least in part on a destination address, and the method further comprises:
 removing the destination address from the wake-up radio frame.

6. A method for receiving a low power wake-up radio frame, the method comprising:
 receiving, at a client station from a wireless access point, a wake-up radio frame;
 identifying a target frame check sequence from the wake-up radio frame;
 determining whether the target frame check sequence was computed using a basic service set identifier based on characteristics of the wake-up radio frame and based on a control bit from a frame control segment of the target frame check sequence, wherein the control bit is indicative of whether the target frame check sequence was computed using the basic service set identifier; and
 in response to determining that the target frame check sequence was not computed using the basic service set identifier,
 computing, a test frame check sequence for the wake-up radio frame using components of the received wake-up radio frame;
 comparing the test frame check sequence with a target frame check sequence from the wake-up radio frame; and
 in response to the determining that the test frame check sequence matches the target frame check sequence, accepting the wake-up radio frame at the client station; and
 in response to the determining that the test frame check sequence does not match the target frame check sequence, discarding the wake-up radio frame at the client station.

7. The method of claim 6, wherein the determining whether the target frame check sequence was computed using the basic service set identifier further comprises:
 determining a type of the received wake-up radio frame; and
 in response to determining that the type of the wake-up radio frame is selected from a group of a beacon frame type, a wake-up frame type, and a vendor specific frame type, determining that the target frame check sequence was computed using the basic service set identifier; and
 in response to determining that the type of the wake-up radio frame is a discovery frame type, determining that the target frame check sequence was computed based on the components of the received wake-up radio frame.

8. The method of claim 6, wherein the determining whether the target frame check sequence was computed using the basic service set identifier further comprises:
 identifying the control bit indicative of whether the target frame check sequence was computed using the basic service set identifier from the frame control segment of the wake-up radio frame.

9. The method of claim 6, further comprising:
 in response to determining that the target frame check sequence was computed using the basic service set identifier:
 computing the test frame check sequence for the wake-up radio frame based on (i) the components of the received wake-up radio frame and (ii) the basic service set identifier.

10. The method of claim 9, wherein computing the test frame check sequence based on (i) the components of the received wake-up radio frame and (ii) the basic service set identifier further comprises:
 computing the target frame check sequence for the wake-up radio frame based at least in part on a destination address assigned to the client station.

11. A network device for creating a low power wake-up radio frame, the network device comprising:
 processing circuitry configured to:
 generate a wake-up radio frame for transmission to one or more client stations;
 determine whether the wake-up radio frame is to be transmitted inside or outside a basic service set associated with the access point, the basic service set having a basic service set identifier that is used to identify the access point; and in response to determining that the wake-up radio frame is to be transmitted outside the basic service set:
compute, a target frame check sequence for the wake-up radio frame without using the basic service set identifier associated with the basic service set;
provide a bit in a frame control segment of the wake-up radio frame indicative of the target frame check sequence computed without using the basic service set identifier associated with the basic service set; and
append the target frame check sequence to the wake-up radio frame; and a transmitter configured to transmit, to the one or more client stations, the wake-up radio frame with the appended target frame check sequence.

12. The network device of claim 11, wherein the processing circuitry is further configured to determine whether the wake-up radio frame is to be transmitted inside or outside a basic service set associated with the access point by:
determining a type of the wake-up radio frame; and
in response to determining that the type of the wake-up radio frame is selected from a group of a beacon frame type, a wake-up frame type, and a vendor specific frame type, determining that the wake-up radio frame is to be transmitted inside the basic service set; and
in response to determining that the type of the wake-up radio frame is a discovery frame type, determining that the wake-up radio frame is to be transmitted outside the basic service set.

13. The network device of claim 11, wherein the processing circuitry is further configured to:
in response to determining that the wake-up radio frame is to be transmitted inside the basic service set:
configure the bit in a frame control segment of the wake-up radio frame to indicate that the target frame check sequence is computed based at least in part on the basic service set identifier.

14. The network device of claim 11, wherein the processing circuitry is further configured to:
in response to determining that the wake-up radio frame is to be transmitted inside the basic service set:
compute the target frame check sequence for the wake-up radio frame based at least in part on the basic service set identifier; and
remove the basic service set identifier from the wake-up radio frame before transmitting the wake-up radio frame with the appended target frame check sequence to the one or more client stations.

15. The network device of claim 14, wherein the processing circuitry is further configured to compute the target frame check sequence for the wake-up radio frame based at least in part on the basic service set identifier by:
computing the target frame check sequence for the wake-up radio frame based at least in part on a destination address, and the processing circuitry is further configured to:
remove the destination address from the wake-up radio frame.

16. A network device for receiving a low power wake-up radio frame, the network device comprising:
a receiver configured to receive, from a wireless access point, a wake-up radio frame;
processing circuitry configured to:
identify a target frame check sequence from the wake-up radio frame;
determine whether the target frame check sequence was computed using a basic service set identifier based on characteristics of the wake-up radio frame and based on a control bit from a frame control segment of the target frame check sequence, wherein the control bit is indicative of whether the target frame check sequence was computed using the basic service set identifier; and
in response to determining that the target frame check sequence was not computed using the basic service set identifier,
compute, a test frame check sequence for the wake-up radio frame using components of the received wake-up radio frame;
compare the test frame check sequence with a target frame check sequence from the wake-up radio frame; and
in response to the determining that the test frame check sequence matches the target frame check sequence, accept the wake-up radio frame at the client station; and
in response to the determining that the test frame check sequence does not match the target frame check sequence, discard the wake-up radio frame at the client station.

17. The network device of claim 16, wherein the processing circuitry is further configured to determine whether the target frame check sequence was computed using the basic service set identifier by:
determining a type of the received wake-up radio frame; and
in response to determining that the type of the wake-up radio frame is selected from a group of a beacon frame type, a wake-up frame type, and a vendor specific frame type, determining that the target frame check sequence was computed using the basic service set identifier; and
in response to determining that the type of the wake-up radio frame is a discovery frame type, determining that the target frame check sequence was computed based on the components of the received wake-up radio frame.

18. The network device of claim 16, wherein the processing circuitry is further configured to determine whether the target frame check sequence was computed using the basic service set identifier by:
identifying the control bit indicative of whether the target frame check sequence was computed using the basic service set identifier from the frame control segment of the wake-up radio frame.

19. The network device of claim 16, wherein the processing circuitry is further configured to:
in response to determining that the target frame check sequence was computed using the basic service set identifier:
compute the test frame check sequence for the wake-up radio frame based on (i) the components of the received wake-up radio frame and (ii) the basic service set identifier.

20. The network device of claim 19, wherein the processing circuitry is further configured to compute the test frame check sequence based on (i) the components of the received wake-up radio frame and (ii) the basic service set identifier by:

computing the target frame check sequence for the wake-up radio frame based at least in part on a destination address assigned to the client station.

\* \* \* \* \*